United States Patent
Ford

(10) Patent No.: US 9,523,452 B2
(45) Date of Patent: Dec. 20, 2016

(54) PRESSURE VESSEL PENETRATOR ISOLATION DEVICE

(71) Applicant: The Boeing Company, Chicago, IL (US)

(72) Inventor: Thomas Steven Ford, Corona, CA (US)

(73) Assignee: The Boeing Company, Chicago, IL (US)

( * ) Notice: Subject to any disclaimer, the term of this patent is extended or adjusted under 35 U.S.C. 154(b) by 401 days.

(21) Appl. No.: 14/169,894

(22) Filed: Jan. 31, 2014

(65) Prior Publication Data

US 2015/0219258 A1 Aug. 6, 2015

(51) Int. Cl.
| | |
|---|---|
| *H02G 3/22* | (2006.01) |
| *F16L 25/02* | (2006.01) |
| *B63G 8/39* | (2006.01) |
| *F16L 23/00* | (2006.01) |
| *F16L 23/18* | (2006.01) |
| *F16L 55/07* | (2006.01) |

(52) U.S. Cl.
CPC .............. *F16L 25/026* (2013.01); *B63G 8/39* (2013.01); *F16L 23/003* (2013.01); *F16L 23/18* (2013.01); *F16L 55/07* (2013.01); *Y10T 29/49947* (2015.01)

(58) Field of Classification Search
CPC ............ F16L 25/02; F16L 23/18; F16L 55/07; F16L 23/00; F16L 25/026; F16L 23/003; F16L 25/18; H01R 13/521; H01R 13/52; H01R 13/5202; H01B 17/305; B63G 8/39; Y10T 29/49947
USPC .. 174/152 GM, 50, 50.5, 50.52, 50.6, 50.61, 174/520, 151, 152 G; 439/587, 272, 521, 439/519, 589, 935
See application file for complete search history.

(56) References Cited

U.S. PATENT DOCUMENTS

| | | | |
|---|---|---|---|
| 2,838,596 A | 6/1958 | Foord | |
| 3,798,586 A | * 3/1974 | Huska | .................. H01R 13/193 439/320 |
| 4,174,145 A | * 11/1979 | Oeschger | ............. H01R 13/521 174/152 GM |

(Continued)

FOREIGN PATENT DOCUMENTS

GB 2443548 A 5/2008

OTHER PUBLICATIONS

Canadian Examination Report for Canadian Patent Application No. 2,869,074 dated Oct. 7, 2015.

(Continued)

*Primary Examiner* — Angel R Estrada
(74) *Attorney, Agent, or Firm* — John S. Economou

(57) ABSTRACT

An isolation device for use with a pressure vessel penetrator. The isolation device is formed from a high performance thermoplastic having low creep properties and includes a central cylindrical portion, a lower inner flange portion and, preferably, an upper outer flange portion. The cylindrical portion has an inner diameter adapted to receive an upper larger diameter portion of the penetrator. The lower inner flange portion is coupled to a lower portion of the central cylindrical portion and forms an aperture for receiving a lower smaller diameter portion of the penetrator. The upper outer flange portion is coupled to an upper portion of the central cylindrical portion and may include clocking apertures. The high performance thermoplastic may be 30% glass-filled PEEK or Torlon®. A custom tapered nut may be provided to secure the penetrator in an internal tapered recess of the pressure vessel.

16 Claims, 6 Drawing Sheets

(56) References Cited

U.S. PATENT DOCUMENTS

| | | | | |
|---|---|---|---|---|
| 5,227,587 A * | 7/1993 | Paterek | ............... | H01B 17/305 |
| | | | | 174/152 GM |
| 7,249,971 B2 * | 7/2007 | Burke | ................. | H01R 13/521 |
| | | | | 439/589 |
| 7,442,081 B2 * | 10/2008 | Burke | ................. | H01R 13/521 |
| | | | | 439/589 |
| 7,581,989 B1 * | 9/2009 | Wheatley | ............... | H01R 43/24 |
| | | | | 439/589 |
| 7,989,984 B2 | 8/2011 | Draper et al. | | |
| 8,461,456 B2 * | 6/2013 | Bernauer | ............. | H01R 13/521 |
| | | | | 174/152 G |
| 2001/0022886 A1 | 9/2001 | Cairns | | |
| 2005/0202720 A1 | 9/2005 | Burke | | |

OTHER PUBLICATIONS

European Search and Examination Report for EP14187839.7 dated Jan. 20, 2015.
SEACON Specification Sheet for Mini-Con Series MIN-BCR-DO (Dual O_RING) Bulkhead Connector Receptacle.

\* cited by examiner

PRESSURE VESSEL PENETRATOR ISOLATION DEVICE

FIELD

The present disclosure relates generally to undersea pressure vessels, and more particularly to the design of penetrator isolation devices for such pressure vessels.

BACKGROUND

Penetrators are typically connectors used to pass signals through an outer wall of an undersea pressure vessel and are designed to be mounted in a manner which maintains the pressure seal between the connector and pressure vessel. Connectors having aluminum connector bodies are often used on the walls of such undersea pressure vessels to mitigate galvanic corrosion. However, such connectors have a limited lifetime and a limited robustness. In one alternative solution, coatings are used, either on the pressure vessel or the connector body, to isolate the pressure vehicle material from connector body material. Such coatings have a limited lifetime and thus a time-limited effectiveness, however. In addition, coatings may create additional problems with the seal between the pressure vehicle and the connector, e.g., the seal may interfere with O-rings or other types of gaskets mounted between the pressure vessel and the connector. In another alternative solution, the pressure vessel may be fabricated from non-aluminum galvanically noble materials. However, such galvanically noble corrosion-resistant metallic materials, e.g., stainless steel, Inconel, Titanium, are both heavier and much more costly than aluminum. The design of efficient subsea unmanned underwater vehicle (one type of undersea pressure vessel) requires that the total weight be minimized as much as possible.

Conventional connectors have a predetermined size which either limits the thickness of the pressure vessel wall or requires a counter-bore on the inner portion of the pressure vessel. A wall thickness that accommodates commercial off the shelf connectors is not adequate for pressure vessels designed for deep sea applications. In addition, the use of a counter-bore can lead to localized stress concentrations in the pressure vessel wall at the counter-bore, possibly leading to metal fatigue and a consequent shortened lifetime for such pressure vessel.

Accordingly, a need exists in the art for an improved system and method for reducing the effect of galvanic corrosion at penetrators (e.g., connectors) passing through the wall of an undersea pressure vessel.

SUMMARY

In accordance with one or more embodiments, an isolation device is provided for use with a penetrator mounted in a pressure vessel in a high pressure environment. The isolation device is formed from a high performance thermoplastic having low creep properties and includes a central cylindrical portion and an inner lower flange portion. The central cylindrical portion has an inner diameter adapted to receive an upper portion of the penetrator. The inner lower inner flange portion is coupled to a lower portion of the central cylindrical portion and forms an aperture for receiving a lower portion of the penetrator, the lower portion of the penetrator having a smaller diameter than the upper portion thereof. The isolation device may further include an upper outer flange portion that is coupled to an upper portion of the central cylindrical portion. Still further, the upper outer flange portion may include at least one clocking aperture for receiving a pin that mates with a recess on an outer surface of a pressure vessel to prevent the isolation device from rotating when the penetrator is secured to the pressure vessel.

The isolation device may include a pressure seal mounted in a slot on an outer surface of the central cylindrical portion and/or a pressure seal mounted in a slot on a lower surface of the lower inner flange portion. The pressure seals may each comprise an o-ring. The high performance thermoplastic having low creep properties may be either polyether ether ketone that is about 30% glass-filled or Torlon®.

In accordance with another embodiment of the present disclosure, a system is provided for dielectric isolation between a penetrator and a pressure vessel. The system includes an isolation device and a custom nut. The isolation device is formed from a high performance thermoplastic having low creep properties and includes a central cylindrical portion and a lower flange portion. The central cylindrical portion has an inner diameter adapted to receive an upper portion of the penetrator The lower inner flange portion is coupled to a lower portion of the central cylindrical portion and forms an aperture for receiving a lower portion of the penetrator, the lower portion of the penetrator having a smaller diameter than the upper portion thereof. The custom nut has an inner-threaded through hole and a tapered shoulder portion adapted to fit within a tapered recessed portion on an inner surface of an outer wall of the pressure vessel. The custom nut and the penetrator are configured to be biased toward each other by engaging the threads on the lower portion of the penetrator with the threads on the inner portion of the custom nut and rotating the custom nut. Preferably, the isolation device further includes an upper outer flange portion that is coupled to an upper portion of the central cylindrical portion. Still further, the upper outer flange portion may include at least one clocking aperture for receiving a pin that mates with a recess on an outer surface of the pressure vessel to prevent the isolation device from rotating when the penetrator is secured to the pressure vessel.

In this embodiment, the isolation device may also include a pressure seal mounted in a slot on an outer surface of the central cylindrical portion and/or a pressure seal mounted in a slot on a lower surface of the lower inner flange portion. The pressure seals may each comprise an o-ring. The high performance thermoplastic having low creep properties may be either polyether ether ketone that is about 30% glass-filled or Torlon®.

In accordance with another embodiment of the present disclosure, a method is provided for installing an isolation device between a penetrator and a pressure vessel. An isolation device is installed into an aperture passing through an outer wall of a pressure vessel, the isolation device formed from a high performance thermoplastic having low creep properties and including a central cylindrical portion and a lower flange portion, the central cylindrical portion having an inner diameter adapted to receive an upper portion of a penetrator, the lower inner flange portion coupled to a lower portion of the central cylindrical portion and forming an aperture for receiving a lower portion of the penetrator. Next, the penetrator is installed into an aperture formed by the central cylindrical portion of the isolation device, the lower portion of the penetrator having a smaller diameter than the upper portion thereof, the lower portion of the penetrator having threads on a lower distal portion thereof. Next, mounting hardware is installed to the threads of the penetrator from an inner side of the outer wall. Finally, the mounting hardware is tightened to secure the isolation device and the penetrator in the aperture. In a further embodiment, the isolation device may further include an upper outer flange portion coupled to an upper portion of the central cylindrical portion and including at least one clocking aperture. This further embodiment includes the additional step of installing at least one clocking pin through the at least one clocking aperture and into a recess in the pressure vessel prior to the step of tightening the mounting hardware.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
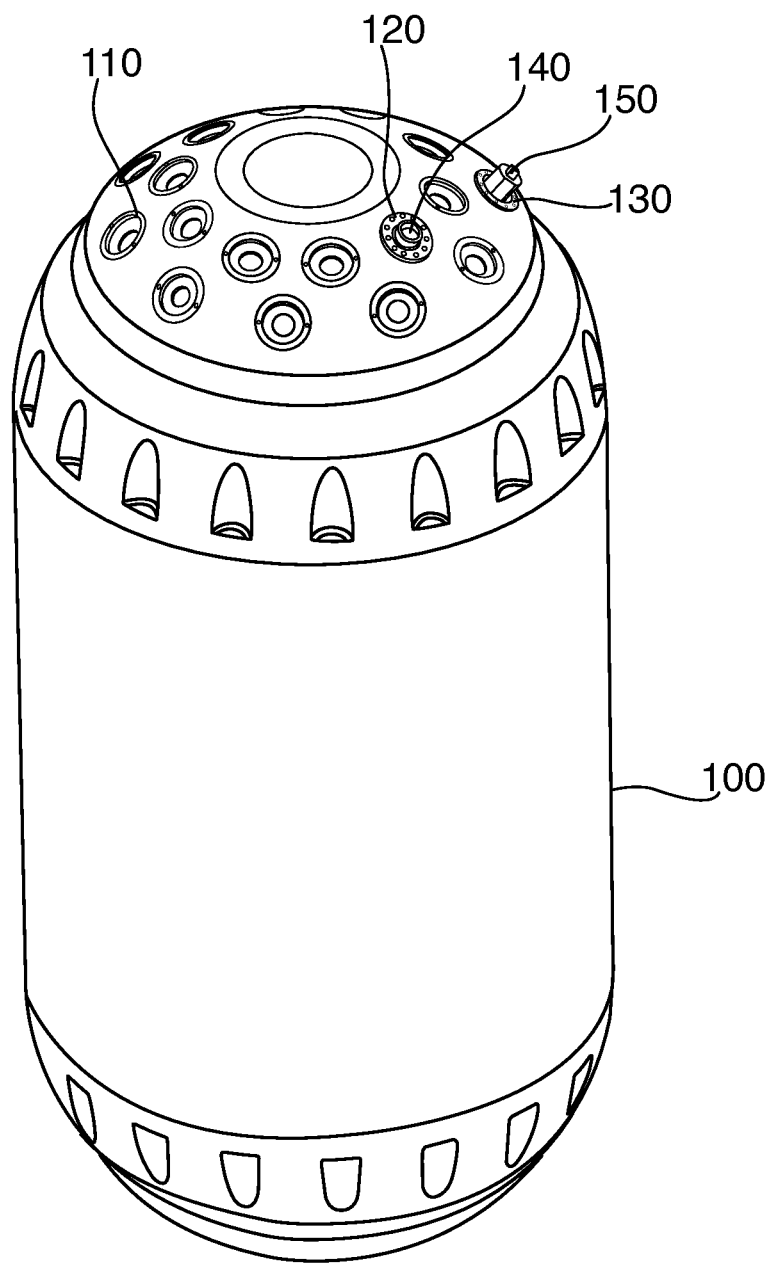
FIG. 1 illustrates a perspective view of a pressure vessel for deep sea use including the penetrator isolation device of a presently preferred embodiment.

Referring now to the drawings and in particular to FIG. 1, a pressure vessel 100, which may be, for example, an undersea pressure vessel, is shown which includes a plurality of through-holes (or apertures) 110 for the installation of penetrator isolation devices. Two such penetrators 140, 150 are shown mounted in pressure vessel 100, with associated penetrator isolation devices 120, 130. Each penetration isolation device 120, 130 is formed from a high performance thermoplastic with established low creep properties. Examples of such high performance thermoplastics include PolyEther Ether Ketone (PEEK), 30% glass filled, and Torlon®. Preferably, penetration isolation device 120 or 130 is machined from the high performance thermoplastic, although, as one of ordinary skill in the art will readily recognize, other methods may also be used to form the device. The key features for the material are that the material have a high compressive strength, low creep and serve as an insulator. The penetration isolation devices 120, 130 serve to insulate the associated penetrator 140, 150 from pressure vessel 100 at any outer surface thereof (i.e., the surfaces exposed to seawater when the pressure vessel 100 is submerged) to prevent galvanic corrosion. In other words, each penetration isolation device 120, 130 provides dielectric isolation between the associated penetrator 140, 150 and pressure vessel 100. As discussed below, one or more o-rings or other types of seals may be additionally used between the penetration isolation devices 120, 130 server and the associated penetrator 140, 150 and/or between penetration isolation devices 120, 130 and pressure vessel 100 to provide a pressure seal and to further protect against galvanic corrosion on internal surfaces.

Figure 2:
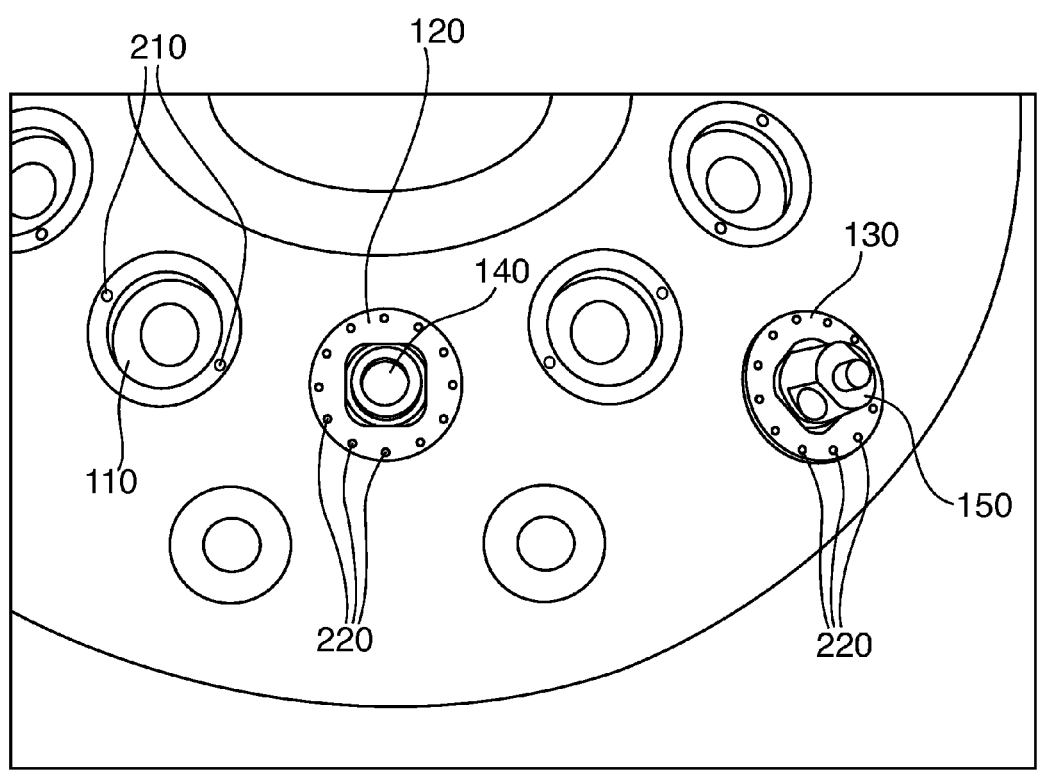
FIG. 2 illustrates a close-up view of the top portion of the pressure vessel of FIG. 1.

FIG. 2 is a close-up view of the upper portion of pressure vessel 100. Two small apertures 210 may be preferably located on pressure vessel on the periphery of the area adjacent to each of the through-holes 110. Each of the penetrator isolation devices 120 may include a number of shallow apertures 220 on a flange portion thereof. When a penetrator isolation device 120, 130 is mounted in a through-hole 110, pins (not shown) may be temporarily inserted through two of the apertures 220 and then into the small apertures 210 (now under the penetrator isolation device 120, 130) to hold the penetrator isolation device 120, 130 in a static (non-moving) position while the associated penetrator 140, 150 is installed (as discussed below). This prevents clocking, i.e., the rotational movement of the penetrator isolation device 120 or 130 while the associated penetrator 140 or 150 is being installed. The penetrators 140, 150 may be commercial off the shelf (COTS) devices, for example, a Seacon® stainless steel connector, e.g., selected from the SEACON® Mini-Con Series of Bulkhead Connector Receptacles, other known metallic pressure vessel penetrators or even a dummy plug for sealing unused apertures in vessel 100. The apertures 220 in penetrator isolation devices 120, 130 are optional and simply assist in the mounting of the penetrators. Further, as one of ordinary skill in the art will readily recognize, the number of apertures 210 is arbitrary and in some cases a single aperture 210 may be adequate. Likewise, although there are twelve apertures 220 shown in FIG. 2 in each penetrator isolation device 120, 130, the number of apertures 220 is also arbitrary and in some cases a single aperture 220 may be adequate.

Figure 3:
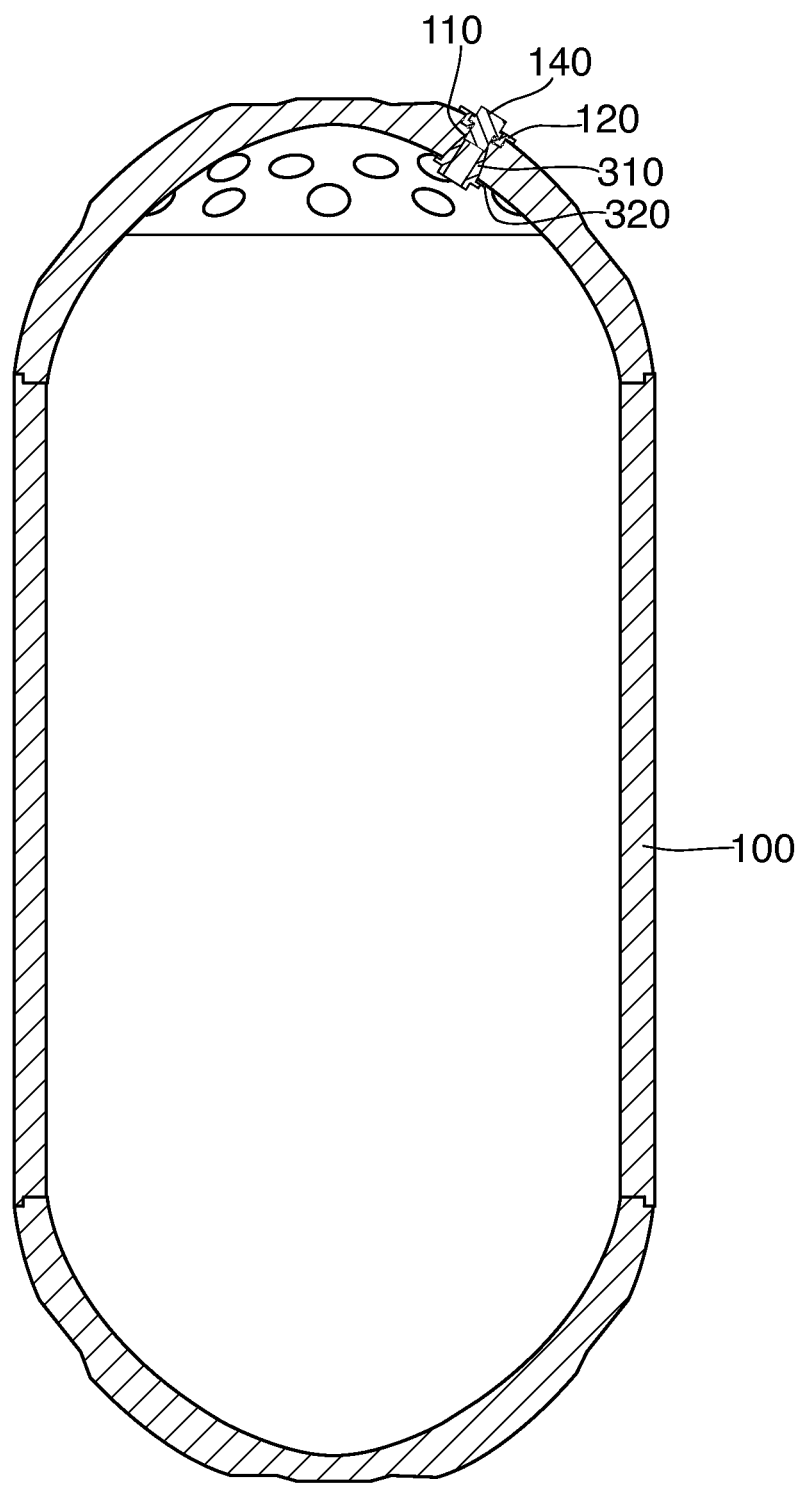
FIG. 3 illustrates a cross-sectional view of the pressure vessel of FIG. 1.

Referring now to FIG. 3, a cross-sectional view of the pressure vessel 100 shows penetrator 140 mounted in a through-hole 110, with penetrator isolation device 120 between an outer surface of the pressure vessel 100 and penetrator 140. A specially designed mounting nut 310 and an associated metal washer 320 are preferably used to secure penetrator 140 in through-hole 110.

Figure 4:
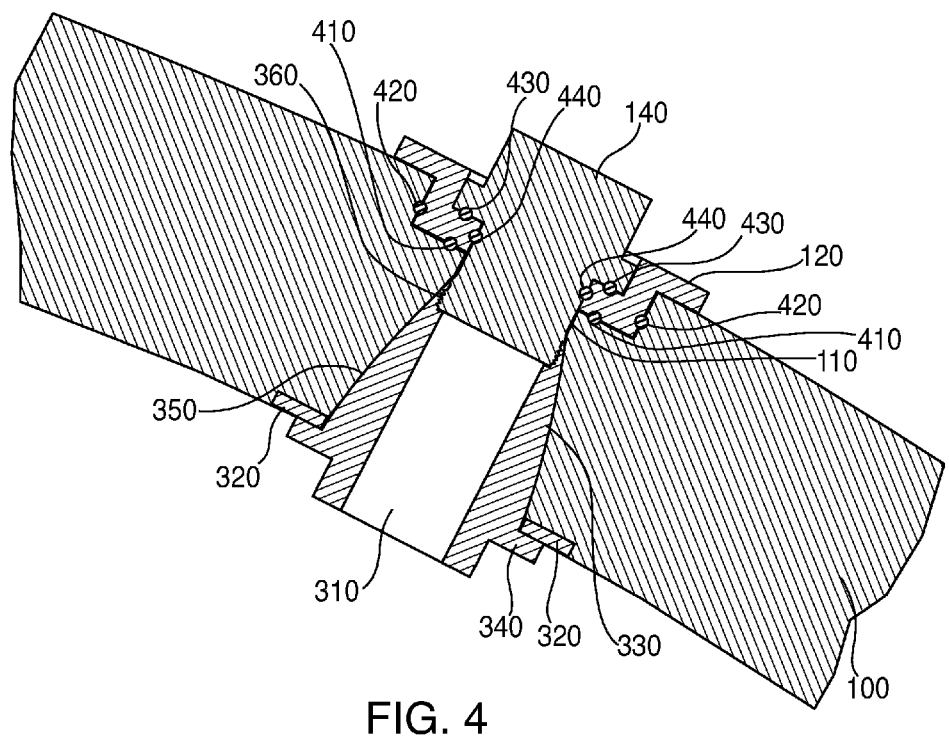
FIG. 4 illustrates a close-up cross-sectional view of the pressure vessel of FIG. 1.

FIG. 4 is a close-up of the upper portion of FIG. 3, and shows additional details of how the penetrator 140 is mounted in through-hole 110. Penetrator 140 has a threaded portion 360 that preferably mates with custom mounting nut 310. An inner portion 350 of through-hole 110 is preferably tapered outwards to accommodate custom mounting nut 310, which includes a tapered body portion 330 and an outer flange 340. The tapering of the inner portion of through-hole 110 and of the mounting nut 310 reduces the stresses that may occur in deep-sea applications when a channel is counter-bored and a conventional nut and washer are used on the threaded portion of penetrator 140. However, as one of ordinary skill in the art will readily recognize, some applications (e.g., applications at lesser depths) may not require the additional stress reduction provided by custom mounting nut 310 and in such cases a counter-bore may be substituted for the tapered inner portion 350 and conventional hardware may be used to secure the penetrator 140.

Figure 5:
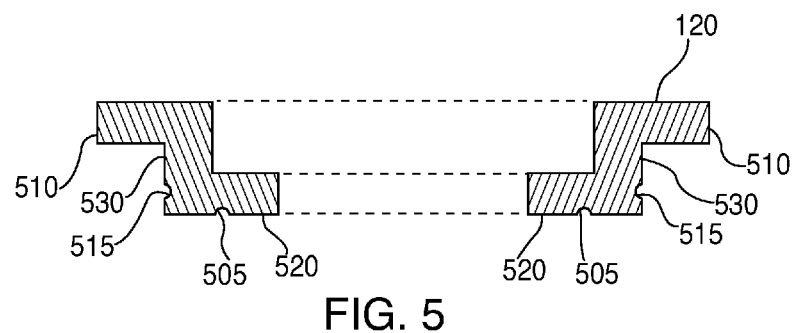
FIG. 5 illustrates a close-up cross-sectional view of the penetrator isolation device of the preferred embodiment.

As shown in detail in FIG. 5, penetrator isolation device 120 includes a central cylindrical portion 530 with a lower inward facing flange portion 520 and an upper outward facing flange portion 510. Penetrator isolation device 120 may also include a first slot 505 and/or a second slot 515 for use with an o-ring or other type of pressure sealing device to aid in the pressure seal. The central cylindrical portion 530 and the lower flange portion 520 are sized to fit snugly with an outer flange portion of the penetrator device 140 shown in FIG. 4, while the upper flange portion 510 is sized to maintain a spacing between the penetrator device 140 and the pressure vessel 100. Upper flange portion 510 prevents galvanic corrosion which may occur without direct contact between penetrator device 140 and pressure vessel 100 in an area thereof exposed to seawater (e.g., due to galvanic currents across an insulator separating the dissimilar metals). Penetrator isolation device 120 provides an excellent sealing interface surface due to the use of the high performance thermoplastics identified above. In addition, the use of such high performance thermoplastics also provides the ability to accommodate penetrator form factor change (i.e., a different size penetrator or a penetrator having a different configuration) by simply changing the size of the penetrator isolation device 120, a significantly lower cost solution than re-machining the aperture(s) in pressure vessel 100.

Referring back to FIG. 4, penetrator isolation device 120 mounts in through-hole 110 in an outer wall of pressure vessel 100. Through-hole 110 is configured to match the outer dimensions of penetrator isolation device 120. Pressure sealing devices, such as o-rings, may be used to ensure a complete pressure seal between penetrator isolation device 120 and pressure vessel 100. In the presently preferred embodiment, two o-rings 410 and 420 are used, one in slot 505 and one in slot 515 (FIG. 5). As one of ordinary skill in the art will readily recognize, other types of pressure sealing devices known to one of skill in the art (e.g., a gasket) may be used in alternative embodiments and in some cases may not be necessary, depending on various factors including in particular the intended pressure level environment. Pressure sealing devices may also be used to ensure a complete pressure seal between penetrator 140 and penetrator isolation device 120. For example, the SEACON® Mini-Con Series of Bulkhead Connector Receptacles uses two o-rings, as shown by the o-rings 430 and 440 in FIG. 4. The respective pressure seals are selected to provide a complete pressure barrier at the intended depth of use. As evident from FIG. 4, penetrator 140 does directly contact pressure vessel 100 below the penetrator isolation device 120, but no galvanic corrosion occurs at this point because the seawater does not penetrate below the pressure seals.

Figure 6:
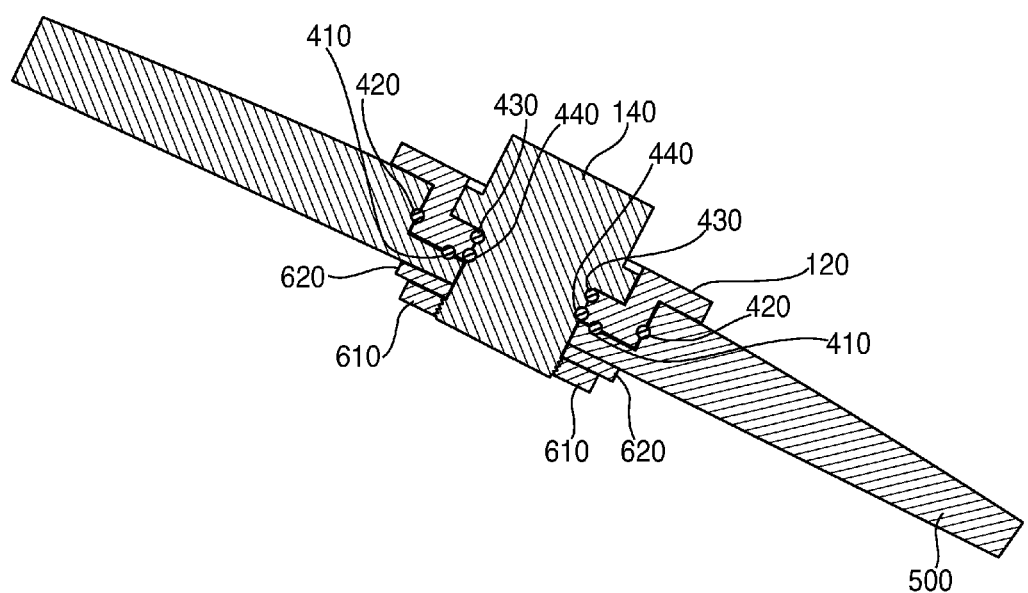
FIG. 6 illustrates a close-up cross-sectional view of the penetrator isolation device of a presently preferred embodiment mounted in a pressure vessel not adapted for deep sea use.

Referring now to FIG. 6, some applications, i.e., at relatively shallow depths, may allow a much thinner outer wall 500 for pressure vessel 100. In such case, penetrator 140 may be secured to the pressure vessel using conventional mounting hardware, e.g., such as is typically provided with penetrator 14. Such mounting hardware includes a washer 620 and a hex mounting nut 610.

Figure 7:
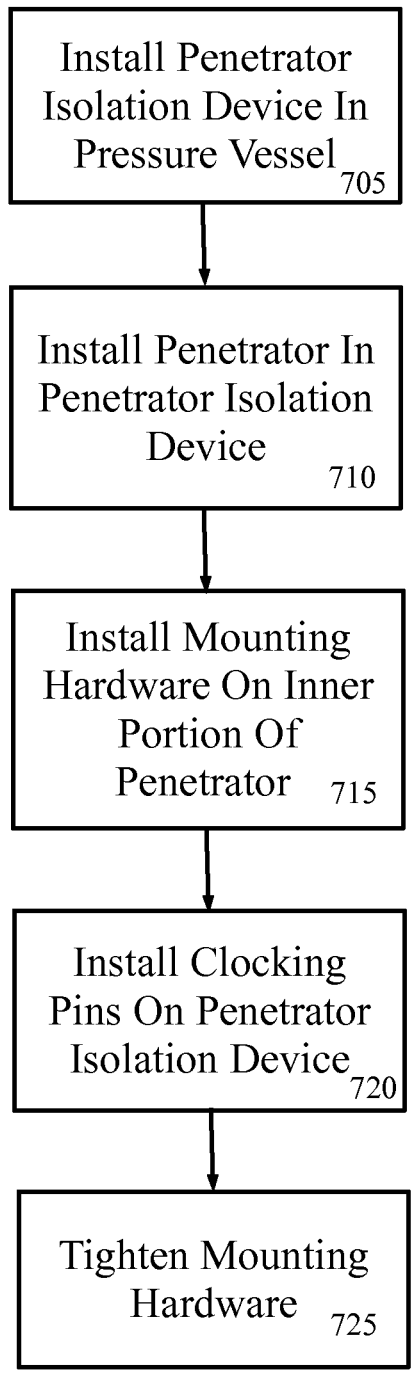
FIG. 7 is a flow-chart illustrating how the penetrator isolation device of the presently preferred embodiment is mounted in a pressure vessel.

Referring now to FIG. 7, the penetrator 140 is installed in pressure vessel 100 by first placing the penetrator isolation device 120 into a channel surrounding the particular through-hole 110 (step 710). Preferably, penetrator isolation device 120 includes o-rings mounted in channels 505 and 515 (FIG. 5). Next, penetrator 140 is inserted into the aperture of penetrator isolation device 120 (step 720). Further, mounting hardware (e.g., nut 340 and washer 320 in FIG. 4 or nut 610 and washer 620 in FIG. 6) is coupled to the threads on penetrator 140 from an inner portion of pressure vessel 100 (step 730). Next, optionally temporary clocking pins are positioned in one or more holes 220 in penetrator isolation device 120 and through to matching holes in the pressure vessel 100 below penetrator isolation device 120 (step 740). Finally, the mounting hardware is tightened securely to ensure that the pressure seal is maintained (step 750). The temporary clocking pins may be removed at this point.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. An isolation device for use with a penetrator in a high pressure environment, the isolation device comprising:
   a central cylindrical portion formed from a high performance thermoplastic having low creep properties, the central cylindrical portion having an outer diameter and an inner diameter, the outer diameter greater than the inner diameter, the inner diameter adapted to receive an upper portion of the penetrator;
   a lower inner flange portion formed from a high performance thermoplastic having low creep properties and coupled to a lower portion of the central cylindrical portion, the lower inner flange portion forming an aperture for receiving a lower portion of the penetrator, the lower portion of the penetrator having a smaller diameter than the upper portion thereof; and
   an upper outer flange portion formed from a high performance thermoplastic having low creep properties, the upper outer flange portion coupled to an upper portion of the central cylindrical portion and having an outer diameter greater than the outer diameter of the central cylindrical portion.

2. The isolation device of claim 1, wherein the upper outer flange portion includes at least one clocking aperture for receiving a pin that mates with a recess on an outer surface of a pressure vessel to prevent the isolation device from rotating when the penetrator is secured to the pressure vessel.

3. The isolation device of claim 1, further comprising:
   a pressure seal mounted in a slot on an outer surface of the central cylindrical portion.

4. The isolation device of claim 3, wherein the pressure seal comprises an o-ring.

5. The isolation device of claim 1, further comprising:
   a pressure seal mounted in a slot on a lower surface of the lower inner flange portion.

6. The isolation device of claim 5, wherein the pressure seal comprises an o-ring.

7. The isolation device of claim 1, wherein the high performance thermoplastic having low creep properties is polyether ether ketone that is about 30% glass-filled.

8. A system for dielectric isolation between a penetrator and a pressure vessel in a high pressure environment, the system comprising:
   an isolation device comprising:
      a central cylindrical portion formed from a high performance thermoplastic having low creep properties and having an inner diameter adapted to receive an upper portion of the penetrator; and
      a lower inner flange portion formed from a high performance thermoplastic having low creep properties and coupled to a lower portion of the central cylindrical portion, the lower inner flange portion forming an aperture for receiving a lower portion of the penetrator, the lower portion of the penetrator having a smaller diameter than the upper portion, the lower portion of the penetrator having threads on a lower distal portion thereof; and a custom nut having an inner-threaded through hole and a tapered shoulder portion adapted to fit within a tapered recessed portion on an inner surface of an outer wall of the pressure vessel, the custom nut and the penetrator being configured to be biased toward each other by engaging the threads on the lower portion of the penetrator with the threads on the inner portion of the custom nut and rotating the custom nut.

9. The system of claim 8, the isolation device further comprising an upper outer flange portion formed from a high performance thermoplastic having low creep properties and coupled to an upper portion of the central cylindrical portion.

10. The isolation device of claim 8, wherein the upper outer flange portion includes at least one clocking aperture for receiving a pin that mates with a recess on an outer surface of the pressure vessel to prevent the isolation device from rotating when the penetrator is secured to the pressure vessel.

11. The system of claim 8, wherein the isolation device further comprises a pressure seal mounted in a slot on an outer surface of the central cylindrical portion.

12. The system of claim 11, wherein the pressure seal comprises an o-ring.

13. The system of claim 8, wherein the isolation device further comprises a pressure seal mounted in a slot on a lower surface of the lower inner flange portion.

14. The system of claim 13, wherein the pressure seal comprises an o-ring.

15. The system of claim 8, wherein the high performance thermoplastic having low creep properties is polyether ether ketone that is about 30% glass-filled.

16. A method for installing an isolation device between a penetrator and a pressure vessel, comprising the steps of:

installing an isolation device into an aperture passing through an outer wall of a pressure vessel, the isolation device formed from a high performance thermoplastic having low creep properties and including a central cylindrical portion and a lower flange portion, the central cylindrical portion having an inner diameter adapted to receive an upper portion of a penetrator, the lower inner flange portion coupled to a lower portion of the central cylindrical portion and forming an aperture for receiving a lower portion of the penetrator;

installing the penetrator into an aperture formed by the central cylindrical portion of the isolation device, the lower portion of the penetrator having a smaller diameter than the upper portion thereof, the lower portion of the penetrator having threads on a lower distal portion thereof;

installing mounting hardware to the threads of the penetrator from an inner side of the outer wall;

tightening the mounting hardware to secure the isolation device and the penetrator in the aperture; and wherein the isolation device further includes an upper outer flange portion coupled to an upper portion of the central cylindrical portion, the upper flange portion including at least one clocking aperture and further comprising the step of installing at least one clocking pin through the at least one clocking aperture and into a recess in the pressure vessel prior to the tightening step.

* * * * *